United States Patent
Humphrey

[11] 3,770,577
[45] Nov. 6, 1973

[54] FIRE RETARDANT PAPER AND PAPER BOARD

[75] Inventor: Sidney Bruce Humphrey, Bel Air, Md.

[73] Assignee: Humphrey Chemical Corporation, Edgewood Arsenal, Md.

[22] Filed: Sept. 23, 1969

[21] Appl. No.: 860,410

[52] U.S. Cl............. 162/159, 106/15 FP, 117/137, 162/181
[51] Int. Cl............................... D21h 3/66
[58] Field of Search.................... 162/159, 181, 168; 117/137; 106/15 FP

[56] References Cited
UNITED STATES PATENTS

| | | | |
|---|---|---|---|
| 2,416,447 | 2/1947 | Laughlin | 106/15 |
| 2,924,532 | 2/1960 | Dreeich | 106/15 |
| 3,385,819 | 5/1968 | Gouinlock | 106/15 |

FOREIGN PATENTS OR APPLICATIONS

| | | | |
|---|---|---|---|
| 508,673 | 12/1954 | Canada | 106/15 |

Primary Examiner—S. Leon Bashore
Assistant Examiner—Richard V. Fisher
Attorney—Cushman, Darby and Cushman

[57] ABSTRACT

A flame and after-glow retardant composition is prepared and incorporated into paper products. The composition is a dry, powdered material consisting essentially of about 2–75 weight percent zinc borate or barium borate, 2–75 weight percent antimony oxide having a maximum particle size of 100 mesh, and 15–85 percent of a solid, suitable organic halide source.

5 Claims, No Drawings

FIRE RETARDANT PAPER AND PAPER BOARD

This invention relates to a flame retarding composition for use in cellulosic materials such as for example paper and paper board. More specifically, this invention relates to a composition comprising zinc borate, antimony oxide, and an organic halide source which, when incorporated into cellulosic materials, significantly retards flaming and after-glow in the cellulosic material.

It is known in the art to incorporate various compounds and compositions into paper or paper products either during the fabrication of the paper or by application as a coating in order to provide fire retarding properties. For example, U.S. Pat. No. 3,202,567 to Murray et al., discloses an emulsion coating comprising polyacrylate, polyvinyl chloride, chlorinated paraffin, antimony oxide and titanium dioxide, but points out that this composition when tested did not give satisfactory smoke and flame ratings. U.S. Pat. No. 2,416,447 to Laughlin et al., discloses the use of a composition comprising antimony trioxide and chlorine containing organic compounds to flame proof paper. Compositions of this type, however, have not proven altogether satisfactory as they lacked the ability to retard afterglow and furthermore require large amounts of antimony trioxide based on the pulp. The antimony compound is relatively expensive. Chlorine containing emulsions of the type disclosed by Laughlin et al., have also been objectionable in being difficult to handle due to tendencies to coagulate and to the presence of emulsifying agents which are generally flammable and can contribute to the combustion of the cellulosic material. The presence of these emulsifying agents also can cause considerable foaming which impedes the paper making process.

Now according to the present invention, a novel composition is provided which can be incorporated as a single ingredient into cellulosic materials such as paper or paper board to provide superior fire retardant and after-glow retardant properties to the cellulosic material. The composition remains in the paper and cannot be leached out nor will it migrate. The fire retardant composition of the present invention comprises a mixture of about 2 to 75 weight percent zinc borate, about 2 to 75 weight percent antimony oxide and about 15 to 85 weight percent of an organic halide source, preferably 15 to 50 percent zinc borate, 15 to 50 percent antimony oxide and 25 to 70 percent organic halide.

The zinc borate employed according to the present invention is actually any one or more of zinc borates, e.g., those having the formula $ZnO \cdot B_2O_3 \cdot 2H_2O$, $2ZnO \cdot 3B_2O_3 \cdot 7H_2O$, and $3ZnO \cdot 2B_2O_3 \cdot 5H_2O$. Generally these zinc borates will be in the form of a fine powder, e.g., particles having a maximum dimension of 100 mesh and the zinc borates usually having a zinc to boron atomic ratio of from 1:1 to 1:4.

The antimony oxide employed in the composition of the present invention can be either $Sb_2O_3$ or $Sb_2O_4$ and has a maximum particle size of 100 mesh (Tyler Screen). The minimum particle size of the zinc borate and antimony oxide is not critical.

The organic halide source employed in the present invention can be, for example, a suitable halogenated polymer or copolymer. Suitable organic halides are, for example, polyvinyl chloride (which is preferred) or polyvinylidene chloride or copolymers of vinyl chloride with vinyl acetate, vinylidene chloride, acrylates, e.g., ethyl acrylate, 2-ethylhexyl acrylate, methyl methacrylate, acrylonitrile, etc. Copolymers of polyvinylidene chloride and acrylates can also be used so long as to the proportion of vinylidene chloride in the copolymr predominates e.g., vinylidene chloride-acrylonitrile (80:20) or vinylidene chloride-vinyl chloride (95:5). Solid chlorinated paraffins, e.g. containing about 70 percent chlorine, can be used in the present invention as well as chlorinated polyethylene, chlorinated diphenyls which are solid, etc. Emulsion polymerized resins which contain residual soaps or wetting agents should, however, preferably be avoided as these can produce undesirable foaming. While generally the halide in the organic halide source employed in this invention will be chlorine, various brominated organic components can be used in place of the chlorinated compounds and in addition some fluorinated polymers and copolymers such as polyvinylidene fluoride and vinylidene fluoride copolymers are useful in the present invention.

The particle size of the organic halide source is of importance in imparting the desired fire retardancy to the paper or paper board while retaining other desirable properties of the paper and minimizing the amount of fire retardant material needed. Generally for lighter weight papers the particle size of the organic halide should be small, for example, a polyvinyl chloride paste resin (PVC plastisol) having a typical particle size of less than 5 microns and preferably about 1 to 2 microns is most useful. For paper board products a larger particle size organic halide source can be employed for economic reasons. For example, polyvinyl chloride blending resin having a predominant particle size of about 25–40 microns but with some particles being even larger is useful. There can also be present polyvinyl chloride resins of smaller particle size in the compositions.

The amount of the fire retardant composition of this invention which is incorporated into the paper to provide fire retarding properties will be from about 5 to 50 percent of the total weight of the paper pulp and preferably about 15 to 30 weight percent. The actual weight percent of the composition incorporated into the paper pulp will however depend often upon the type of paper being produced. Generally, about 20 to 30 weight percent of the fire retardant composition of the present invention is incorporated into lightweight papers. As little as about 10 weight percent of the composition is incorporated into heavier weight papers; and around 5 weight percent is often employed in very heavy weight products such as insulation board. In the case of insulation board, however, the bulk of the fire retardant composition is applied to the surface of the material.

The fire retardant composition of the present invention is employed preferably as a dry powdered mixture and can be added to the furnish at any convenient point during the fabrication of the material from the beater to the headbox or cylinder vat as long as thorough dispersion is insured. Size press application and coating with suitable binders can also be employed. The pH is normally adjusted to about 4.5–5.0 for example by addition of alum but this is not essential. The amount of fire retardant composition employed will depend on, in addition to the type of paper as heretofore discussed, such parameters as furnish, basis weight, finish and degree of desired fire retardance.

The incorporation into the paper stock of suitable conventional retention aids in order to insure retention of the fire retardant composition in the paper is often desirable. Generally about 0.1 to 0.5 weight percent based on the weight of the pulp of the retention aid is sufficient to insure the necessary retention of the fire retardant composition. The point of addition of the retention aid should generally be as close as possible to the headbox or cylinder vat in order to insure good mixing with a minimum of sheer or violent turbulence. Suitable retention aids for use in the present invention are any of a number of commericially available preparations such as for example commercially available cationic alkylated aminopolyamide epichlorohydin resins obtained by reacting a saturated aliphatic dicarboxylic acid containing from three to 10 carbon atoms with a polyalkylene polyamine and having as recurring groups —NH($C_nH_{2n}$HN)$_x$—CORCO—where $n$ and $x$ are each 2 or more and R is the divalent hydrocarbon radical of the dicarboxylic acid and the various Nalco retention aids such as Nalco 632 which is a polymeric organic compound.

The recycle of as much white water as possible is also advantageous and desirable.

Fire retardant compositions according to the present invention were prepared as shown in the following examples.

EXAMPLE 1

| | Parts by dry weight |
|---|---|
| Zinc Borate $ZnOB_2O_3.2H_2O$ | 16.67 |
| Antimony trioxide | 33.33 |
| Polyvinyl chloride plastisol resin | 50.00 |

EXAMPLE 2

| | |
|---|---|
| Zinc Borate $ZnOB_2O_3.2H_2O$ | 25.00 |
| Antimony trioxide | 25.00 |
| PVC plastisol resin | 50.00 |

EXAMPLE 3

| | |
|---|---|
| Zinc Borate $2ZnO.B_2O_3.7H_2O$ | 16.67 |
| Antimony trioxide | 33.33 |
| PVC plastisol resin | 50.00 |

EXAMPLE 4

| | |
|---|---|
| Zinc Borate $3ZnO.2B_2O_3.5H_2O$ | 16.67 |
| Antimony trioxide | 33.33 |
| PVC plastisol resin | 50.00 |

EXAMPLE 5

| | |
|---|---|
| Zinc Borate $ZnO.B_2O_3.2H_2O$ | 33.33 |
| Antimony trioxide | 16.67 |
| PVC plastisol resin | 50.00 |

EXAMPLE 6

| | |
|---|---|
| Zinc Borate $ZnO.B_2O_3.2H_2O$ | 25.00 |
| Antimony trioxide | 25.00 |
| PVC plastisol resin | 25.00 |
| Chlorinated paraffin (70%) | 25.00 |

EXAMPLE 7

| | |
|---|---|
| Zinc Borate $ZnO.B_2O_3.2H_2O$ | 41.67 |
| Antimony trioxide | 8.33 |
| Chlorinated paraffin (70%) | 50.00 |

EXAMPLE 8

| | |
|---|---|
| Zinc Borate $ZnO.B_2O_3.2H_2O$ | 33.33 |
| Antimony trioxide | 16.67 |
| Chlorinated paraffin (70%) | 50.00 |

EXAMPLE 9

| | |
|---|---|
| Zinc Borate $ZnO.B_2O_3.2H_2O$ | 15.00 |
| Antimony trioxide | 15.00 |
| PVC Plastisol resin | 70.00 |

It has also been found that barium borates, e.g., barium metaborate $BaB_2O_4 \cdot H_2O$, are also effective and can be used in place of the zinc borates in an equal amount. A typical formulation is:

| | Parts by weight |
|---|---|
| Barium metaborate | 16.67 |
| Antimony trioxide | 33.33 |
| Polyvinyl chloride plastisol resin | 50.00 |

The barium borate compositions can be added to paper and paper bound in the same manner as the zinc borate formulations.

The fire retardant preparation of this invention having the compositions shown in Example 1–9 were incorporated into paper prior to the head box and tested according to ASTM-D77 (T APPI Method T 461 m-48) and found satisfactory in suppressing flame and after-glow. The quantities used in Tables I and II were higher than would be required in commercial operation because hand sheets were employed.

TABLE I

| No. | A | B | C | D | E | F | G | Results |
|---|---|---|---|---|---|---|---|---|
| 1 | 30 | 20.0 | 15.4 | | | 50 | | Too brittle. |
| 2 | 30 | 20.0 | 9.2 | | 1.0 | 40 | | No flame, no glow. |
| 3 | 30 | 12.0 | 12.2 | | 1.0 | 40 | | Marginal flame, no glow. |
| 4 | 30 | | 9.2 | | | 40 | 5.0 | Marginal flame, no glow. |
| 5 | 30 | | | | 13.4 | 25 | | Burns and glows. |
| 6 | 30 | | | 6.0 | 2.0 | 40 | 4.0 | No flame, no glow. |
| 7 | 30 | | | 6.0 | 1.0 | 40 | 5.0 | Marginal flame, no glow. |
| 8 | 30 | | | 4.5 | 1.5 | 30 | 3.0 | Marginal flame, no glow. |

A—Wt. dry pulp (grams).
B—25% Aqueous slurry of $ZnOB_2O_3 \cdot 2H_2O$ (grams).
C—Aqueous slurry (65% solids) of chlorinated paraffin resin containing 70% chlorine (grams) (Rezo Sperse).
D—Dry chlorinated paraffin resin containing 70% chlorine (grams) (Chlorez 700).
E—Antimony oxide.
F—Theoretical add on percent based on dry pulp.
G—Powdered $ZnOB_2O_3 \cdot 2H_2O$ (grams).

TABLE II

| Test | ZnO·B₂O₃ (wt. %) | Sb₂O₃ (wt. %) | PVC resin (wt. %) | Char length (inches) | Afterglow (seconds) |
|---|---|---|---|---|---|
| 1 | 25 | 25 | 50 | 1¾ | 1 |
|   |    |    |    | 1¾ | 1 |
|   |    |    |    | 2  | 1 |
| 2 | 16.7 | 33.3 | 50 | 2 | 1 |
|   |    |    |    | 3 | 1 |
| 3 |    | 50 | 50 | 2½ | 8 |
|   |    |    |    | 1⅞ | 12 |
|   |    |    |    | 2¼ | 6 |
| 4 | 25 | 25 | 50 | 3½ | 2 |
|   |    |    |    | 2½ | 1-2 |
| 5 | 16.7 | 33.3 | 50 | 2⅙ | 2 |
|   |    |    |    | 2 | 3 |

Tests 1–3 were carried out on 3 grams pulp (corresponding to 60 lb. basis weight/ream) according to TAPPI Method T 461 m-48, the pulp having incorporated therein 40 weight % of the retardant composition indicated (based on the weight of the pulp).

Tests 4–5 employed 2.5 grams pulp (corresponding to 50 lb. basis weight/ream) in which was incorporated 30 weight % of the fire retardant composition indicated. In both cases addition of the retardant composition to the pulp was before reaching the head box. pH was adjusted to 4.5 with alum. A retention aid (cationic alkylated aminopolyamide epichlorohydrin) was incorporated into the pulp also at a rate of 10 lbs/ton of pulp).

Further compounding on a commercial scale was also carried out as set forth in the following examples.

EXAMPLE 10

Using a single cylinder machine there was employed 2,000 lbs of pulp, 20 pounds of alum and 8 lbs. of Nalco 632 (a retention aid). The fire retardant was added to the pulp after the alum while the Nalco 632 was just before the cylinder vat. Six different samples of fire retardant were tried (a) 600 lbs. of the formulation of Example 1 (b) 500 lbs. of the formulation of Example 1, (c) 400 lbs. of the formulation of Example 1.

Samples (d), (e) and (f) were like samples (a), (b) and (c) except that a polyvinyl chloride blending resin (25–40 mean micron size) was employed in place of the polyvinyl chloride plastisol resin.

In all six samples there were produced 0.030 inch sheets having a density of 1.0. The products were fire retardant in every case.

EXAMPLE 11

Using a fourdrinier machine there was employed 2,000 lbs. of pulp, 25 lbs of alum, 7 lbs. of Nalco 632 and 500 lbs of the formulation of Example 1. The fire retardant was added after the alum while the Nalco 632 was added just ahead of the headbox. 50 lb. basis weight sheet was produced which was fire retardant.

EXAMPLE 12

Using a six-cylinder machine, there was employed 2,000 lbs. of pulp, 9 lbs. of Nalco 632, 500 lbs. of the composition of Example 1 in which the plastisol, however, was replaced by the polyvinyl chloride blending resin (25–40 mean micron particle size). There was produced a fire retardant sheet having a thickness of 0.014 inches and a density of 1.0.

The Nalco 632 was divided into 6 equal portions with 1 portion going into each of the six cylinder vats.

What is claimed is:

1. A flame and after-glow retardant composition for use in cellulosic material consisting essentially of a dry, powdered material of about 2–75 weight percent barium borate, 2–75 weight percent antimony oxide having a maximum particle size of 100 mesh and 15–85 weight percent of a solid suitable organic halide source.

2. A paper product in which is incorporated about 5 to 50 weight percent based on the weight of the pulp of the flame retardant composition of claim 1.

3. The paper product of claim 2 wherein said product is paperboard and the amount of flame retardant composition added to the paper is about 5 weight percent based on the weight of the pulp.

4. The paper product of claim 2 wherein the product is paper and the flame retardant is added in an amount of about 5 weight percent of the pulp.

5. The paper product of claim 2 wherein the product is paper and the flame retardant is added in an amount of about 10–30 percent based on the weight of the pulp.

* * * * *